March 16, 1965     C. R. WILES ETAL     3,173,975
METHOD OF MOLDING A FOAMED ARTICLE HAVING METAL
PARTICLES UNIFORMLY DISTRIBUTED THEREIN
Filed June 16, 1961
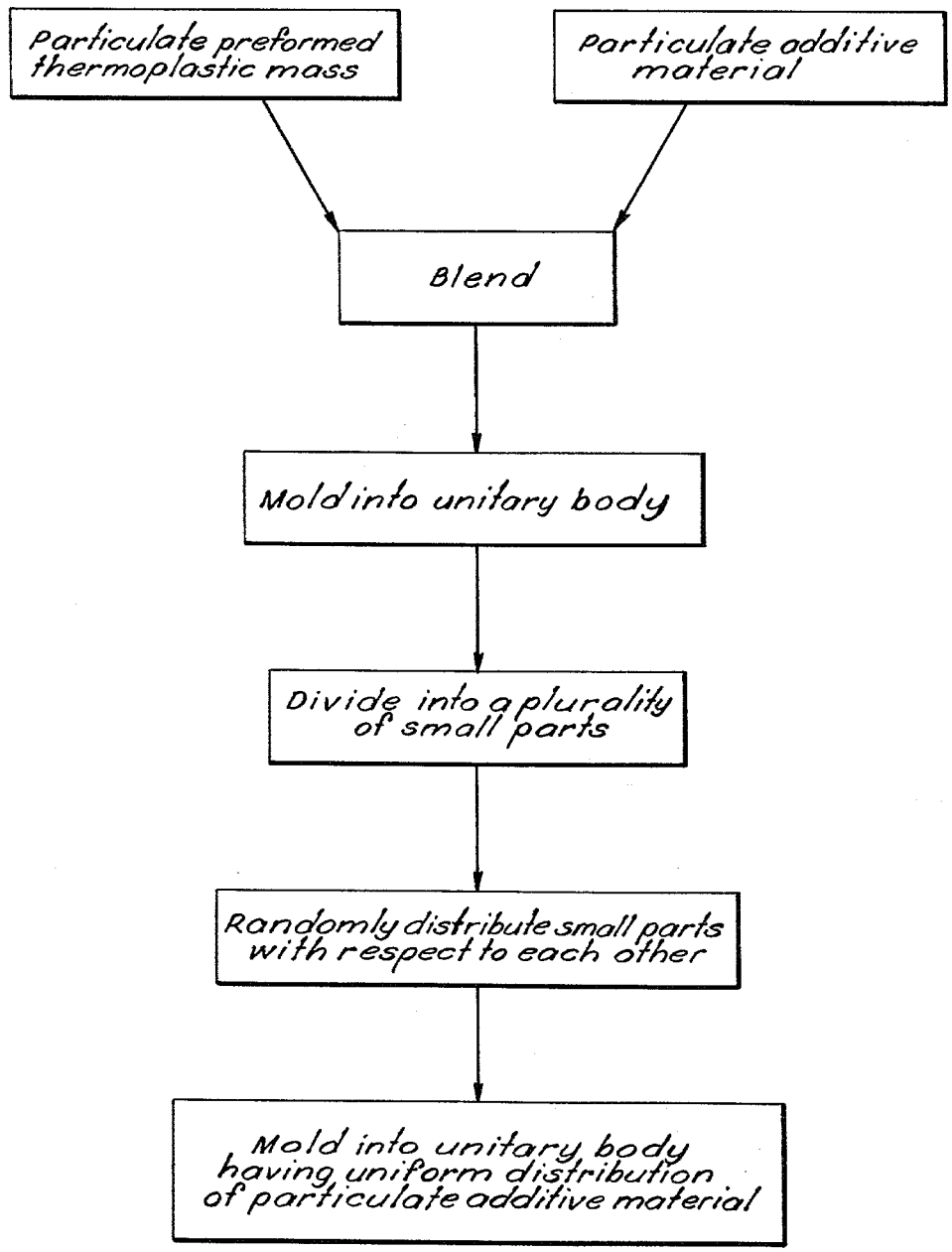
INVENTORS.
Charles R. Wiles
Earl E. Guilford
Lawrence R. Stanford
BY
AGENT United States Patent Office 3,173,975
Patented Mar. 16, 1965

3,173,975
METHOD OF MOLDING A FOAMED ARTICLE HAVING METAL PARTICLES UNIFORMLY DISTRIBUTED THEREIN
Charles R. Wiles, Earl E. Guilford, and Lawrence R. Stanford, all of Midland, Mich., assignors to The Dow Chemical Company, Midland, Mich., a corporation of Delaware
Filed June 16, 1961, Ser. No. 117,670
4 Claims. (Cl. 264—51)

This invention relates to a method for the incorporation of solid bodies into thermoplastic compositions. It more particularly relates to the incorporation of sliver-like metal particles and like materials uniformly within a body of expanded thermoplastic material.

The admixture of solid materials with thermoplastic resins for most practical purposes is readily accomplished by mechanical milling, dry blending, and the like techniques. Much difficulty is frequently encountered if the material to be admixed with thermoplastic material is larger than dusts or finely divided particulate masses such as material which will easily pass through a 100 mesh screen (U.S. Sieve Size). If the density of the solid particulate material to be mixed with the thermoplastic resinous composition is significantly different than that of the thermoplastic resinous composition, stratification tends to occur if the materials are dry blended. By the term dry blending is meant the simple admixture of two particulate masses by such means as ribbon blenders, tumblers, and the like. Particularly vexations is the problem of blending metal particles such as aluminum slivers with resins such as polystyrenes for the preparation of lenses employed in very high frequency and ultra high frequency antenna systems for use with radio signals. Such lenses are described in United States Patents 2,716,190 and 2,943,358. Generally, these lenses are comprised of expanded thermoplastic resinous material having a relatively low dielectric loss factor and a particulate metal, advantageously aluminum, incorporated in an expanded resin matrix as small, discrete particles of rather definite dimension and configuration for optimum performance. For satisfactory performance of such a lens system, the dielectric constant of the foam materials must be held within rigid limits if optimum beam, width, and pattern are to be achieved. At the present time, generally the dielectric constant uniformity of such compositions obtained in commercial production is about 80 to 90 percent, that is, the variation in dielectric constant throughout a block or body prepared from a thermoplastic expandable material having metal slivers or particles dispersed therein will vary by a factor plus or minus 5 to 10 percent from the average dielectric constant of the block. The uniformity equals $$\left(1 - \frac{K-1}{Ko}\right) \times 100$$

where $Ko$ is the average dielectric constant and $K$ is the measurement showing the greatest deviation from the average. A uniformity of 80 to 90 percent, although operative for some purposes, is considerably less than desirable for antenna systems having high resolution, narrow beam width and closely controlled radiation patterns.

It is an object of this invention to provide an improved method for the fabrication of foamed plastic articles having relatively high density particles dispersed therein in uniform manner.

It is a further object of this invention to incorporate metallic particles into an expanded thermoplastic composition in such a manner that a high degree of uniformity and random dispersion is obtained.

It is a further object of this invention to incorporate metallic particles into an expanded polystyrene composition in such a manner that a high degree of uniformity and random dispersion is obtained.

It is another object of this invention to provide a method for the preparation of expanded plastic bodies of a desired dielectric constant suitable for the fabrication of Luneberg Lenses.

These objects and other advantages are accomplished in accordance with the invention by fabricating an expanded thermoplastic final unitary body of a desired density having uniformly dispersed therethrough a particulate additive material comprising: providing a particulate mass of partly expanded thermoplastic resinous material having a density greater than said desired density, blending said mass with said particulate additive material, molding the resultant blended mass into a unitary mass, dividing said unitary mass into a plurality of small bodies, each having a volume not more than about one hundredth that of said final body, intermixing said small bodies together to provide a random distribution and molding said randomly distributed small bodies into a final unitary body having a uniform distribution of additive material throughout said body and said desired density.

The accompanying figure serves to illustrate the basic method of the invention.

In fabricating unitary expanded thermoplastic resinous bodies in accordance with the invention, a wide variety of polymeric materials may be employed. However, where such bodies are to be utilized in conjunction with equipment operating the radio frequency range wherein the expanded thermoplastic material is adapted to pass high frequency electromagnetic radiation, it is desirable that a basic resin be employed which has a relatively low dielectric loss factor. Such a resinous material which has found wide acceptance is polystyrene; however, the method of the invention may be practiced with a number of other expandable resinous compositions such as are described in United States Letters Patents 2,669,751, and 2,857,625.

Advantageously, the expanded particulate material employed in the practice of the invention is prepared from solid expandable particles by gently heating the particles until a degree of expansion substantially less than the maximum is obtained. Oftentimes 50 to 70 percent of the maximum is employed where relatively low density foamed bodies are to be the final product. Oftentimes if suitable care is exercised in packing the smaller bodies for the second molding operation to eliminate free space between the particles, prefoaming from 70 to 99 percent of the final desired density is possible. In cases where a more dense product is to be obtained, initial expansion to from about 10 to about 50 percent of the maximum is often beneficial.

Typical materials which may be incorporated into an expanded thermoplastic resinous body comprises slivers, planchettes, and decorative inclusion of contrasting color. Aluminum slivers having a length of about 0.50 inch and a cross section of about .2 mil×2.3 mil are frequently employed for the fabrication of expanded plastic bodies having predetermined dielectric constants. Specific examples of such metallic particles are set forth in United States Letters Patent 2,716,190.

In the blending operation, the slivers or other particulate additive material are adhered to the particulate expanded plastic material. Advantageously, the additive material may be adhered to the partly expanded thermoplastic resinous material by several methods. The particulate expanded material may be wetted with water or an adhesive solution and the additive material then added to an agitating mass of the partly foamed plastic articles. Beneficially, if a static charge is formed on the surface of the prefoamed granular plastic sufficient attraction often results between expanded plastic particles and the metal sliver to hold them together for a first molding operation. When a satisfactory blend of additive material and the prefoamed plastic particulate material is attained, it is then molded by conventional means to a unitary mass having a density greater than the desired density of the final product. Typical methods of molding such materials are described in United States Patents 2,669,751, and 2,857,625. One of the more convenient methods is to confine the partly expanded body of particulate material to be molded in a mold which will not permit expansion of the foam beyond a desired predetermined density, passing steam through perforations in the walls of the mold and oftentimes directly inserting into the particulate body suitable conduits to carry steam into the central portion of the mass to cause expansion and knitting together of the plastic particles to form a unitary object.

Subsequent to the initial molding operation, the unitary object so prepared is divided into a plurality of smaller bodies. These bodies often have a major dimension of from about ¼ of an inch to about 2 inches in most operations. Beneficially, a convenient symmetrical shape is that of a cube and advantageously having an edge dimension of about ½ inch is found generally satisfactory for the preparation of dielectric material for use in Luneberg lenses.

Such cubic particles are readily formed from a large block by slicing with knives and saws which tend to cut the parent body without causing undue deformation of the smaller particles. Saws or knives usually permit, in an operation of this nature, relatively rigid control of size and geometric configuration. Shapes other than a cube may be employed in the practice of the invention, such as, for example, spheres, dodecahedrons, tetrahedrons, and similar geometric forms. Generally, a cubic form is the simplest and easiest to prepare and yields uniformity results substantially commensurate with those obtained employing other geometric forms. Alternately the first molded body may be torn apart by a mechanical shredder to give small bodies of desired dimensions.

The degree of division of the first molded body required will depend upon the degree of uniformity required in the final product and for many practical purposes it is sufficient to divide the first molded body into about 100 parts and oftentimes into as many as about $1.1 \times 10^5$ parts as in the case of distributing aluminum slivers in polystyrene foam for electronic applications where the ultimate molded body is a 24 inch cube. For certain applications where extreme uniformity is required, division of the first molded body into $10^6$ and even $10^7$ parts is beneficial.

When the molded, additive-containing body is divided into suitable particulate form, the particles are mixed to achieve random distribution. Mixing of the small cubes or generally similar particles containing additive material is readily accomplished employing a wide variety of conventional equipment.

A rotating drum is frequently found to be a satisfactory device for mixing small batches whereas larger batches may be prepared by means of air agitation in a vessel or mechanical rotation of an inclined vessel having flights disposed on the inner walls thereof in a manner similar to that employed in a conventional cement mixer. Other similar equipment such as ribbon blenders and the like devices well known in a solids handling art may also be utilized. Sometimes it is advantageous to pack the particles in close order array such as is readily done with cube, tetrahedron plates and the like. In such a case a suitable selection of the bodies for packing must be made to insure adequate intermixing.

When the small bodies are randomly distributed with respect to each other, they are then molded and expanded substantially in the same manner as employed in the first molding step to a predetermined desired density.

Expanded thermoplastic bodies containing dispersed incompatible materials formed in accordance with the invention are found to have uniformity of dielectric constant aproaching 100 percent. This is in sharp contrast to bodies formed by conventional methods where a uniformity of about 90 percent is obtained. Lenses formed in accordance with the present invention give significantly superior performance to those of the prior art. Improved and more precise beam width, dielectric constant, and similar properties are obtained by employing foamed bodies prepared in accordance with the present invention. The improved properties are due to the uniformity of dispersion and lack of orientation of the metallic particles within the expanded plastic matrix. It is believed that the improved degree of uniformity obtained is primarily due to the first molding step and the subsequent comminution and intermixing prior to the molding of the final article. In most methods presently employed for the production of expanded plastic bodies having dispersed therein incompatible materials such as metal slivers and the like, a relatively large difference in density exists between the additive and the matrix material. In conventional molding operations wherein the particulate expandable mass is admixed with a relatively dense additive some stratification or separation tends to occur during molding giving rise to non-uniform distribution of the additive throughout the final molded body. In the present invention this is eliminated by the plurality of molding steps where a body having a uniformity closely approaching that of the art is subdivided into small geometrical symmetrical forms. The subsequent randomizing of generally symmetrical geometric forms containing slightly different amounts of the additive material gives rise to the uniform quality or distribution of the additive material in the final molding.

By way of further illustration, particulate polystyrene was foamed to a bulk density of about 2 pounds per cubic foot. The foamed particles were admixed with polystyrene coated aluminum slivers in the ratio of 170 grams of coated slivers per 3.37 cubic feet of the prefoamed polystyrene. The aluminum slivers were 0.2 mil in thickness, 2.3 mils in width, about 187 mils in length, and were coated with a 1 mil layer of polystrene. The blending operation comprised continuously adding prefoamed granules and aluminum slivers to the top of a 12 foot high tower containing a plurality of vibrating screens having one half inch openings and spaced 6 inches apart. The aluminum and foam were discharged from the bottom of the tower into a sheet aluminum mold. The sheet aluminum mold, when closed, was an 18 inch cube fabricated from 2 millimeter sheet aluminum having 1/16 inch holes uniformly distributed over the surface to give a total area of opening of 24 percent. The mold was filled with the prefoamed particle aluminum sliver blend and placed in a chamber wherein 1 face of the mold was connected to a vacuum line. Air was removed from the chamber until an obsolute pressure of 150 millimeters of mercury was obtained within the chamber. Steam was introduced into the chamber and forced through the five sides of the mold not connected to the vacuum line. The steam pressure within the chamber was gradually raised until the temperature of the polystyrene granules reached 90° centigrade. The steam pressure was then increased to 3 pounds per square inch guage for a period of 3 minutes. The steam was turned off, vacuum applied to the entire chamber, causing the condensed moisture to cool the foamed mass. When the pressure within the chamber was 150 millimeters of mercury absolute, the mold was removed and a unitary body about 18 inches on the side removed from the mold. The molded body was cut into cubes having a dimension of one half inch per side by knives. The half inch cubes were agitated to achieve a random distribution with respect to each other. A sufficient quantity of the half inch cubes were placed into the 18 inch cube mold to produce a product having a final density of 1.5 pounds per cubic foot, and the previously described molding operation was repeated. After removal from the mold, the polystyrene foamed block was dried in an oven at 170° Fahrenheit for 7 days and found to have a dielectric constant of 1.46 at 194 megacycles. This dielectric constant was equivalent to refractive index of 1.205. A plurality of measurements indicated that the maximum deviation of the refractive index from the average in any of the eight 9 inch cubes which were cut from the molded 18 inch cube was 0.004. In contrast, similar size cubes, molded in accordance with the prior art, generally exhibited a refractive index difference or deviation of about .128 to .130.

Although the invention has been described with particular reference to the severing of the large block into a plurality of symmetrical geometric forms having a dimension of about ½ inch, it is readily practiced with larger or smaller bodies depending upon the degree of uniformity required in the final product.

As is apparent from the foregoing specification the method of the present invention is susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. The method of fabricating an expanded thermoplastic final unitary body of a desired density having uniformly dispersed therethrough a particulate metal additive material comprising: providing a particulate mass of partly expanded thermoplastic resinous material having a density greater than said desired density, blending said mass with said particulate additive material, confining said mass within a configuration and heating the resultant blended mass to form a unitary mass, dividing said unitary mass into a plurality of small bodies, each having a volume not more than about one hundredth that of said final body, intermixing said small bodies together to provide a random distribution and confining the small bodies within a configuration and heating said randomly distributed small bodies to form a final expanded unitary body having a uniform distribution metal of additive material throughout said body and said desired density.

2. The method of claim 1, wherein said unitary mass having a density greater than the desired product is divided into a plurality of cubes.

3. The method of claim 1, wherein said particulate partly expanded thermoplastic resinous composition is an expanded polystyrene.

4. The method of claim 1, wherein the additive material comprises elongated aluminum particles.

References Cited in the file of this patent
UNITED STATES PATENTS

| | | |
|---|---|---|
| 2,419,035 | Quinn et al. | Apr. 15, 1947 |
| 2,531,739 | Orsini | Nov. 28, 1950 |
| 2,716,190 | Baker | Aug. 23, 1955 |
| 2,787,809 | Stastny | Apr. 9, 1957 |
| 2,806,509 | Bozzacco et al. | Sept. 17, 1957 |
| 2,996,709 | Pratt | Aug. 15, 1961 |
| 3,041,303 | Nelson | June 26, 1962 |
| 3,089,857 | Pottenger | May 14, 1963 |